US012508000B2

(12) United States Patent
Huang et al.

(10) Patent No.: US 12,508,000 B2
(45) Date of Patent: Dec. 30, 2025

(54) SYSTEMS AND METHODS FOR FINDING HEPATO-RENAL INDICES

(71) Applicant: KONINKLIJKE PHILIPS N.V., Eindhoven (NL)

(72) Inventors: Sheng-Wen Huang, Ossining, NY (US); Hua Xie, Cambridge, MA (US); Man M Nguyen, Melrose, MA (US); Vijay Thakur Shamdasani, Kenmore, MA (US); William Tao Shi, Wakefield, MA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 195 days.

(21) Appl. No.: 17/775,635

(22) PCT Filed: Nov. 22, 2020

(86) PCT No.: PCT/EP2020/082998
§ 371 (c)(1),
(2) Date: May 10, 2022

(87) PCT Pub. No.: WO2021/099629
PCT Pub. Date: May 27, 2021

(65) Prior Publication Data
US 2022/0401078 A1  Dec. 22, 2022

Related U.S. Application Data
(60) Provisional application No. 62/938,615, filed on Nov. 21, 2019.

(51) Int. Cl.
*A61B 8/00* (2006.01)
*A61B 8/08* (2006.01)
(Continued)

(52) U.S. Cl.
CPC .............. *A61B 8/5223* (2013.01); *A61B 8/08* (2013.01); *A61B 8/14* (2013.01); *A61B 8/463* (2013.01);
(Continued)

(58) Field of Classification Search
CPC .. A61B 8/08; A61B 8/14; A61B 8/463; A61B 8/469; A61B 8/485; A61B 8/5207; A61B 8/5223; A61B 8/54; G01S 15/8915
See application file for complete search history.

(56) References Cited

U.S. PATENT DOCUMENTS 6,443,896 B1  9/2002  Detmer
6,530,885 B1  3/2003  Entrekin et al.
(Continued)

FOREIGN PATENT DOCUMENTS

CN  104757999 A  7/2015
EP  3505070 A1  7/2019
WO  2016120745 A1  8/2016

OTHER PUBLICATIONS

Masayuki Tanabe, "Ultrasound Imaging", 2011 (Year: 2011).*
(Continued)

*Primary Examiner* — Brooke Lyn Klein

(57) ABSTRACT

Systems and methods for calculating hepato-renal index (HRI) values from radiofrequency (RF) data are disclosed herein. The RF data may include fundamental frequency components, harmonic frequency components, or a combination thereof. Signal intensities within regions of interest may be calculated from the RF data. The signal intensities may be averaged to arrive at an average signal intensity value for each region of interest. In some examples, some of the highest and/or lowest signal intensity values may be removed prior to averaging. The ratio of the average signal
(Continued)

intensities from the different regions of interest may be then be taken to arrive at the HRI values.

11 Claims, 5 Drawing Sheets

(51) Int. Cl.
    *A61B 8/14*     (2006.01)
    *G01S 15/89*     (2006.01)

(52) U.S. Cl.
    CPC ............ *A61B 8/469* (2013.01); *A61B 8/5207* (2013.01); *A61B 8/54* (2013.01); *G01S 15/8915* (2013.01)

(56) References Cited

U.S. PATENT DOCUMENTS

| | | |
|---|---|---|
| 2002/0128555 A1 | 9/2002 | Maxwell |
| 2015/0086094 A1* | 3/2015 | Chang ................... G06T 7/0012 382/128 |
| 2017/0273667 A1 | 9/2017 | Labyed |
| 2017/0351937 A1* | 12/2017 | Lu .......................... G06T 7/0014 |
| 2018/0000452 A1* | 1/2018 | Adams ................. A61B 8/4488 |
| 2019/0200962 A1* | 7/2019 | Lee ........................... G06T 7/12 |
| 2019/0209488 A1* | 7/2019 | Theodotou ............. A61K 31/05 |

OTHER PUBLICATIONS

F. Tranquart, "Clinical Use of Ultrasound Tissue Harmonic Imaging", Elsevier, 1999 (Year: 1999).*

International Search Report and Written Opinion for PCT/EP2020/082998; Mailing Date: Feb. 2, 2021, 9 pages.

Jakovljevic M. et al., "In vivo application of short-lag spatial coherence imaging in human liver", Ultrasound Med Biol. 2013; vol. 39, No. 3, pp. 534-542.

Anvari A. et al., "A Primer on the Physical Principles of Tissue Harmonic Imaging", Radiographics, 2015, vol. 35, No. 7, pp. 1955-1964.

Lee, CH. et al, "Fade-out sign on hepatic tissue harmonic compound sonography: a value as a new sign in the diagnosis of fatty liver", Eur J Radiol., 2011, vol. 80, No. 3, pp. e258-e262.

* cited by examiner

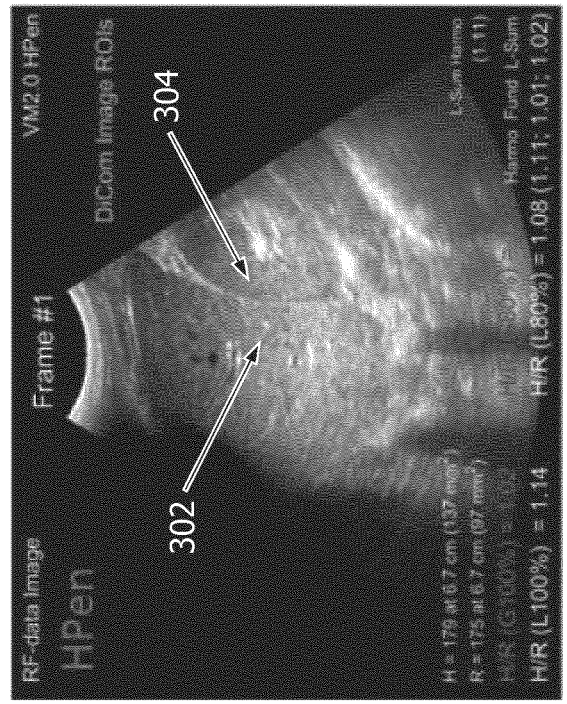
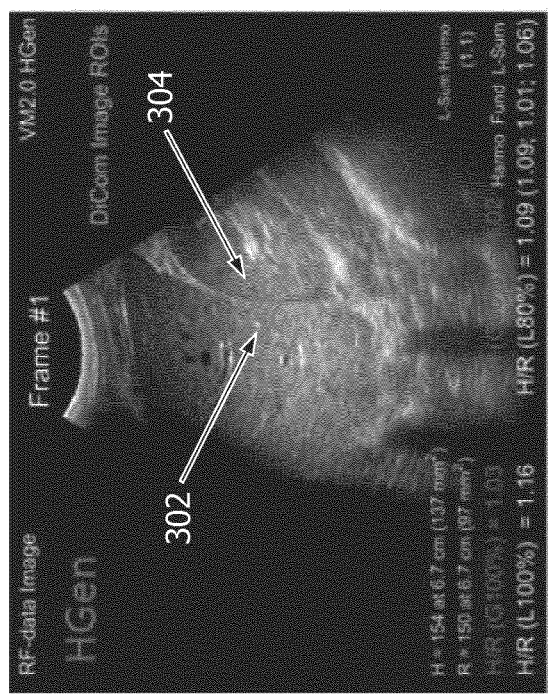
FIG. 3A
FIG. 3B

SYSTEMS AND METHODS FOR FINDING HEPATO-RENAL INDICES

CROSS-REFERENCE TO PRIOR APPLICATIONS

This application is the U.S. National Phase application under 35 U.S.C. § 371 of International Application No. PCT/EP2020/082998, filed on Nov. 22, 2020, which claims the benefit of U.S. Provisional Patent Application No. 62/938,615, filed on Nov. 21, 2019. These applications are hereby incorporated by reference herein.

TECHNICAL FIELD

This application relates to ultrasound-based indicators for liver disease. More specifically, this application relates to ultrasound-based hepato-renal indices.

BACKGROUND

Non-alcoholic Fatty Liver Disease (NAFLD) has become one of the major causes of liver disease due to high prevalence of obesity and diabetes. Its incidence rate has been steadily increasing affecting about 25%-30% population in western and developing countries. The clinical term for fatty liver is hepatic steatosis, defined as excessive accumulation of fat (above 5%-10% by weight) in liver cells as triglycerides. Early stage of liver steatosis is silent and reversible by simple life style change, for instance through regular exercise and healthy dieting. Liver steatosis can turn into more advanced liver disease such as non-alcoholic steatohepatitis (NASH) and liver fibrosis. If left untreated at these stages, fatty liver will progress to end-stage disease including cirrhosis and primary cancer hepatocellular carcinoma.

In current clinical practice, the gold standard of fatty liver diagnosis is liver biopsy, an invasive procedure subject to sampling error and interpretation variability. Magnetic resonance proton density fat fraction (MR-PDFF) is considered the new reference standard for NAFLD diagnosis as it can provide a quantitative biomarker of liver fat content. However MR-PDFF is an expensive diagnostic tool which may not be available at every hospital. Compared to MR, ultrasound is a widely available and cost-effective imaging modality, more suitable for screening general population and low-risk groups.

Hepato-renal index (HRI), an ultrasound based method, has been used clinically for fatty liver detection. Excessive fat infiltration in liver increases acoustic backscattering coefficient leading to higher grayscale values in ultrasound B-mode imaging. At a normal state, liver parenchyma and renal cortex have similar echogenicity. With more fat deposit, liver will appear more hyperechoic (i.e. brighter) than kidney cortex. HRI is often calculated as the echo-intensity ratio of liver to kidney. Based on the B-mode data echo intensities from the liver and kidney are estimated by selecting regions of interest (ROIs) within the liver parenchyma and the kidney cortex at a similar depth and then averaging grayscale echo-intensity values in the ROIs. However, there are reliability issues with HRI that limit its application—mainly due to the non-linear relationship between the display intensity (logarithmically scaled or grayscale) and the true in-situ echo intensity. Also, the type of imaging and imaging frequency can also impact reliability and reproducibility of the HRI. Accordingly, improved techniques for acquiring the HRI are desired.

SUMMARY

Systems and methods for calculating the HRI that are independent of imaging modes and instrument settings are described. In particular, as disclosed herein, the HRI may be calculated based on the radio frequency (RF) data of two ROIs, one in the liver and one in the kidney. In some examples, the RF data may be divided between harmonic and fundamental frequency components. In some examples, the RF data may be filtered to remove outliers from the ROIs. The systems and methods disclosed herein may result in more reliable and/or consistent HRI values.

In accordance with at least one example disclosed herein, an ultrasound imaging system may include an ultrasound probe configured to transmit ultrasound signals and receive echoes responsive to the ultrasound signals and provide radio frequency (RF) data corresponding to the echoes, a user interface configured to receive indications of a first region of interest (ROI) and a second ROI, a signal processor configured to receive the RF data and separate the RF data into harmonic frequency components and fundamental frequency components, and a processor configured to receive the indications of the first ROI and the second ROI, receive the harmonic frequency components and the fundamental frequency components for the first ROI and the second ROI, calculate a first average signal intensity value for the first ROI and calculate a second average signal intensity value for the second ROI based, at least in part, on at least one of the harmonic frequency components or the fundamental frequency components, and calculate a ratio of the first average signal intensity value and the second average signal intensity value.

In accordance with at least one example disclosed herein, a method may include receiving an indication of a first region of interest (ROI), receiving an indication of a second ROI, receiving radio frequency (RF) data corresponding to the first ROI, receiving RF data corresponding to the second ROI, calculating a first plurality of signal intensity values for locations in the first ROI, calculating a second plurality of signal intensity values for locations in the second ROI, determining a first average signal intensity from the first plurality of signal intensity values, determining a second average signal intensity from the second plurality of signal intensity values, and taking a ratio of the first average signal intensity and the second average signal intensity to generate a hepato-renal index (HRI) value.

In accordance with at least one example disclosed herein, a non-transitory computer readable medium including instructions, that when executed, may cause an ultrasound imaging system to receive an indication of a first region of interest (ROI), receive an indication of a second ROI, receive radio frequency (RF) data corresponding to the first ROI, receive RF data corresponding to the second ROI, calculate a first plurality of signal intensity values for locations in the first ROI, calculate a second plurality of signal intensity values for locations in the second ROI, determine a first average signal intensity from the first plurality of signal intensity values, determine a second average signal intensity from the second plurality of signal intensity values, and take a ratio of the first average signal intensity and the second average signal intensity to generate a hepato-renal index (HRI) value.

BRIEF DESCRIPTION OF THE DRAWINGS

FIG. 3A is an example ultrasound image of a first subject acquired in a first harmonic/fundamental imaging mode according to principles of the present disclosure.

FIG. 3B is an example ultrasound image of the first subject acquired in a second harmonic/fundamental imaging mode according to principles of the present disclosure.

DESCRIPTION

The following description of certain exemplary examples is merely exemplary in nature and is in no way intended to limit the disclosure or its applications or uses. In the following detailed description of examples of the present systems and methods, reference is made to the accompanying drawings which form a part hereof, and in which are shown by way of illustration specific examples in which the described systems and methods may be practiced. These examples are described in sufficient detail to enable those skilled in the art to practice the presently disclosed systems and methods, and it is to be understood that other examples may be utilized and that structural and logical changes may be made without departing from the spirit and scope of the present disclosure. Moreover, for the purpose of clarity, detailed descriptions of certain features will not be discussed when they would be apparent to those with skill in the art so as not to obscure the description of the present disclosure. The following detailed description is therefore not to be taken in a limiting sense, and the scope of the present systems and methods is defined only by the appended claims.

The hepato-renal index (HRI) is typically acquired based on the pixel intensities of the B-mode image displayed on an ultrasound imaging system. HRI can be a powerful diagnostic indicator for fatty liver disease when it is measured properly using a well-defined grayscale imaging mode with optimal instrumental settings of gain, time gain control (TGC), dynamic range, display map (ideally, linear conversion of echo intensities from decibel scale to grayscale), etc. However, the reliability of HRI suffers from a severely nonlinear relationship between a logarithmically scaled (or often even more complexed) and further threshold-limited grayscale display (0-255) versus the true in-situ echo intensity of B-mode image data. In addition, the echo intensity is strongly dependent on both the types of image mode (e.g., harmonic vs fundamental imaging) and the frequency content of imaging pulses. Accordingly, one or more HRIs, HRI combinations and/or ratios that are less dependent on imaging or display settings of the ultrasound system are desired. HRIs that are independent of imaging modes and instrument settings may allow for more reliable, consistent hepato-renal quantification for diagnosis and monitoring of fatty liver disease.

The present disclosure is directed to systems and methods for calculating HRIs (e.g., HRI values) based on RF data. In some examples, the RF data may include fundamental and harmonic frequency components. Calculating the HRI from RF data may provide values that are less sensitive to imaging modes and/or instrument settings compared to HRI values based on image intensity values measured from B-mode images.

Figure 1:
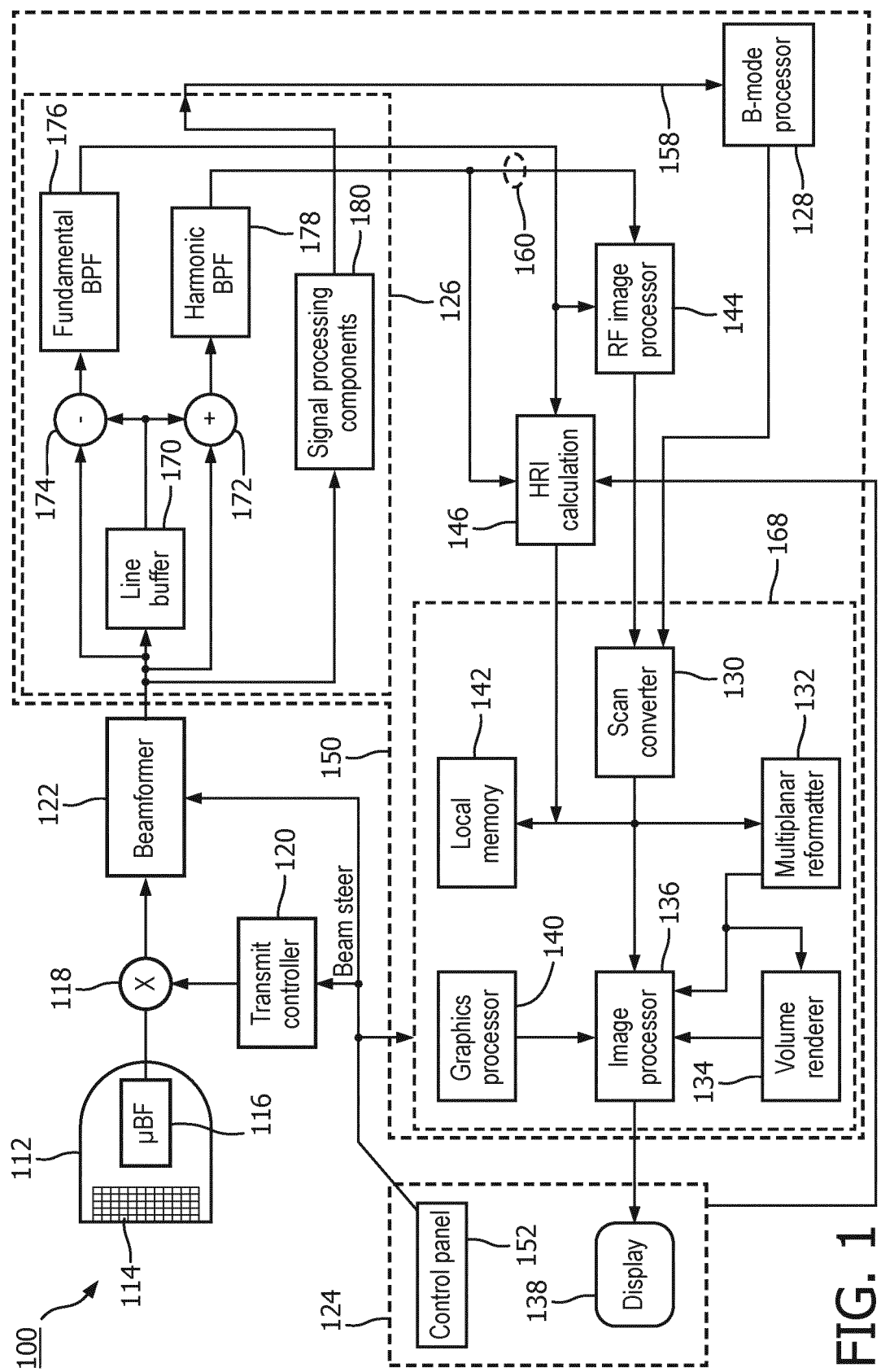
FIG. 1 is a block diagram of an ultrasound imaging system arranged according to principles of the present disclosure.

FIG. 1 shows a block diagram of an ultrasound imaging system 100 constructed in accordance with the principles of the present disclosure. An ultrasound imaging system 100 according to the present disclosure may include a transducer array 114, which may be included in an ultrasound probe 112, for example an external probe or an internal probe such as an intravascular ultrasound (IVUS) catheter probe. In other examples, the transducer array 114 may be in the form of a flexible array configured to be conformally applied to a surface of subject to be imaged (e.g., patient). The transducer array 114 is configured to transmit ultrasound signals (e.g., beams, waves) and receive echoes (e.g., received ultrasound signals) responsive to the transmitted ultrasound signals. A variety of transducer arrays may be used, e.g., linear arrays, curved arrays, or phased arrays. The transducer array 114, for example, can include a two dimensional array (as shown) of transducer elements capable of scanning in both elevation and azimuth dimensions for 2D and/or 3D imaging. As is generally known, the axial direction is the direction normal to the face of the array (in the case of a curved array the axial directions fan out), the azimuthal direction is defined generally by the longitudinal dimension of the array, and the elevation direction is transverse to the azimuthal direction.

In some examples, the transducer array 114 may be coupled to a microbeamformer 116, which may be located in the ultrasound probe 112, and which may control the transmission and reception of signals by the transducer elements in the array 114. In some examples, the microbeamformer 116 may control the transmission and reception of signals by active elements in the array 114 (e.g., an active subset of elements of the array that define the active aperture at any given time).

In some examples, the microbeamformer 116 may be coupled, e.g., by a probe cable or wirelessly, to a transmit/receive (T/R) switch 118, which switches between transmission and reception and protects the main beamformer 122 from high energy transmit signals. In some examples, for example in portable ultrasound systems, the T/R switch 118 and other elements in the system can be included in the ultrasound probe 112 rather than in the ultrasound system base, which may house the image processing electronics. An ultrasound system base typically includes software and hardware components including circuitry for signal processing and image data generation as well as executable instructions for providing a user interface.

The transmission of ultrasonic signals from the transducer array 114 under control of the microbeamformer 116 is directed by the transmit controller 120, which may be coupled to the T/R switch 118 and a main beamformer 122. The transmit controller 120 may control characteristics of the ultrasound signal waveforms transmitted by the transducer array 114, for example, amplitude, phase, and/or polarity. The transmit controller 120 may control the direction in which beams are steered. Beams may be steered straight ahead from (orthogonal to) the transducer array 114, or at different angles for a wider field of view. The transmit controller 120 may also be coupled to a user interface 124 and receive input from the user's operation of a user control. For example, the user may select whether the transmit controller 120 causes the transducer array 114 to operate in a combined harmonic/fundamental imaging mode or other imaging mode (e.g., Doppler). The user interface 124 may include one or more input devices such as a control panel 152, which may include one or more mechanical controls (e.g., buttons, encoders, etc.), touch sensitive controls (e.g., a trackpad, a touchscreen, or the like), and/or other known input devices.

In some examples, the partially beamformed signals produced by the microbeamformer 116 may be coupled to a main beamformer 122 where partially beamformed signals from individual patches of transducer elements may be combined into a fully beamformed signal. In some examples, microbeamformer 116 is omitted, and the transducer array 114 is under the control of the beamformer 122 and beamformer 122 performs all beamforming of signals. In examples with and without the microbeamformer 116, the beamformed signals of beamformer 122 are coupled to processing circuitry 150, which may include one or more processors (e.g., a signal processor 126, a B-mode processor 128, RF image processor 144, HRI calculator 146, and one or more image generation and processing components 168) configured to produce an ultrasound image from the beamformed signals (i.e., beamformed RF data).

The signal processor 126 may include a line buffer 170, a summer 172, a subtractor 174, a fundamental bandpass filter (BPF) 176, and a harmonic BPF 178. In some examples, when the system is operating in a combined harmonic/fundamental imaging mode, the transducer array 114 may perform two-pulse transmission. In two-pulse transmission, the same ultrasound pulse is transmitted twice in succession to each point in an imaging region but in differently modulated forms. For example, the pulses may be inverted from one another (e.g., one pulse has a phase or polarity inverse of the other pulse). The signals resulting from echoes of these two pulses may be received by the line buffer 170 from the beamformer 122. The line buffer 170 may store the signals from the first pulse of the two-pulse transmission for later processing. When the signals from the second pulse of the two-pulse transmission is received from the beamformer 122, both the first and second sets of signals may be provided to the summer 172 and subtractor 174. This may cause the signals returned from a common point in the imaging region to be combined.

The summer 172 may add the signals from the first and second pulses together. The additive combination of the oppositely phased or polarity signals may result in a cancellation of fundamental frequency components and the production of harmonic frequency components. The harmonic frequency components may be provided to the harmonic BPF 178. The subtractor 174 may subtract the signals from first pulse from the second pulse or vice versa. The difference of the oppositely phased or polarity signals may result in a reinforcement of the fundamental frequency components and elimination of the harmonic frequency components. These fundamental frequency components may be provided to the fundamental BPF 176.

The fundamental BPF 176 and/or harmonic BPF 178 may include one or more BPFs. The filters may be implemented in hardware software, or a combination thereof to process the harmonic and/or fundamental signal components. In some examples, the number of BPFs, width of the BPFs, and center frequency of the BPFs may be adjustable. The adjustments may be based, at least in part, on exam type, probe type, and/or user input via the user interface 124. The fundamental BPF 176 may output fundamental signals and the harmonic BPF 178 may output harmonic signals for further processing and/or analysis by other components of system 100.

The signal processor 126 may be further configured to process the received beamformed RF data in various ways, such as additional bandpass filtering, decimation, and I and Q component separation. The signal processor 126 may also perform additional signal enhancement such as speckle reduction, signal compounding, and electronic noise elimination. These are generally shown as signal processing components 180 in FIG. 1. The processed signals (also referred to as I and Q components or IQ signals) may be coupled to additional downstream signal processing circuits for image generation. The IQ signals may be coupled to a plurality of signal paths within the system, each of which may be associated with a specific arrangement of signal processing components suitable for generating different types of image data (e.g., B-mode image data, Doppler image data). For example, the system may include a B-mode signal path 158 which couples the signals from the signal processor 126 to a B-mode processor 128 for producing B-mode image data and a RF signal path 160 which couples the harmonic signals and fundamental signals to an RF image processor 144 for producing RF image data and HRI calculator 146 for calculating HRI values.

In some examples, the B-mode processor 128 may receive the filtered signals from the fundamental BPF 176 and harmonic BPF 178 and combine the signals for further processing to generate the B-mode image. In other examples, the B-mode processor 128 may receive signals processed by the signal processor 126 in other manners (e.g., the IQ signals). For example, the transmit controller 120 may interleave pulses for acquiring B-mode images with the two-pulse transmissions for retrieving the fundamental and harmonic data. The B-mode processor 128 can employ amplitude detection for the imaging of structures in the body.

In some examples, the signals from the fundamental BPF 176 and the harmonic BPF 178 may be provided to an RF image processor 144. The RF image processor 144 may combine the harmonic and fundamental signals at each point in the imaging region based on a desired weighting. For example, the RF image processor 144 may generate an image based entirely on the harmonic signals, entirely on the fundamental signals, or a blend of the harmonic and fundamental signals. The weighting of the fundamental and harmonic signals may be based on a user input provided via the user interface 124 in some examples. Examples of suitable techniques for generating harmonic, fundamental, and blended images may be found in PCT Application No. PCT/IB2016/050216.

The signals produced by the B-mode processor 128 and/or the RF Image processor 144 may be coupled to a scan converter 130 and/or a multiplanar reformatter 132. The scan converter 130 may be configured to arrange the echo signals from the spatial relationship in which they were received to a desired image format. For instance, the scan converter 130 may arrange the echo signal into a two dimensional (2D) sector-shaped format, or a pyramidal or otherwise shaped three dimensional (3D) format.

The multiplanar reformatter 132 can convert echoes which are received from points in a common plane in a volumetric region of the body into an ultrasonic image (e.g., a B-mode image, harmonic image, fundamental image, blended image) of that plane, for example as described in U.S. Pat. No. 6,443,896 (Detmer). The scan converter 130 and multiplanar reformatter 132 may be implemented as one or more processors in some examples.

A volume renderer 134 may generate an image (also referred to as a projection, render, or rendering) of the 3D dataset as viewed from a given reference point, e.g., as described in U.S. Pat. No. 6,530,885 (Entrekin et al.). The volume renderer 134 may be implemented as one or more processors in some examples. The volume renderer 134 may generate a render, such as a positive render or a negative render, by any known or future known technique such as surface rendering and maximum intensity rendering.

Output (e.g., B-mode images, fundamental/harmonic images) from the scan converter 130, the multiplanar reformatter 132, and/or the volume renderer 134 may be coupled to an image processor 136 for further enhancement, buffering and temporary storage before being displayed on an image display 138.

A graphics processor 140 may generate graphic overlays for display with the images. These graphic overlays can contain, e.g., standard identifying information such as patient name, date and time of the image, imaging parameters, and the like. For these purposes the graphics processor may be configured to receive input from the user interface 124, such as a typed patient name or other annotations. The user interface 124 can also be coupled to the multiplanar reformatter 132 for selection and control of a display of multiple multiplanar reformatted (MPR) images.

The system 100 may include local memory 142. Local memory 142 may be implemented as any suitable non-transitory computer readable medium (e.g., flash drive, disk drive). Local memory 142 may store data generated by the system 100 including images, HRI calculations, executable instructions, inputs provided by a user via the user interface 124, or any other information necessary for the operation of the system 100.

As mentioned previously system 100 includes user interface 124. User interface 124 may include display 138 and control panel 152. The display 138 may include a display device implemented using a variety of known display technologies, such as LCD, LED, OLED, or plasma display technology. In some examples, display 138 may comprise multiple displays. The control panel 152 may be configured to receive user inputs (e.g., imaging mode, selection of regions of interest). The control panel 152 may include one or more hard controls (e.g., buttons, knobs, dials, encoders, mouse, trackball or others). In some examples, the control panel 152 may additionally or alternatively include soft controls (e.g., GUI control elements or simply, GUI controls) provided on a touch sensitive display. In some examples, display 138 may be a touch sensitive display that includes one or more soft controls of the control panel 152.

According to principles of the present disclosure, the system 100 may include a HRI calculator 146. The HRI calculator 146 may be implemented in software, hardware, or a combination thereof. For example, the HRI calculator 146 may be implemented by a processor that executes instructions for calculating one or more HRI values. The HRI calculator 146 may receive the fundamental signals from the fundamental BPF 176 and the harmonic signals from the harmonic BPF 178. The HRI calculator 146 may receive indications of selections of ROIs from the user interface 124. One of the ROIs may be from an area of an image corresponding to the hepatic parenchyma and another ROI may be from an area of the image corresponding to the renal cortex. The HRI calculator 146 may use the fundamental signals, the harmonic signals, or a combination thereof that were acquired from the regions corresponding to the ROIs to calculate one or more Hills. Various techniques may be used to calculate the HRI, as will be discussed further below. The HRI generated by the HRI calculator 146 may be provided to the local memory 142 for storage and/or to the image processor 136 for displaying to the user on display 138.

In some examples, various components shown in FIG. 1 may be combined. For instance, image processor 136 and graphics processor 140 may be implemented as a single processor. In another example, the scan converter 130 and multiplanar reformatter 132 may be implemented as a single processor. In some examples, various components shown in FIG. 1 may be implemented as separate components. For example, signal processor 126 may be implemented as separate signal processors for each imaging mode (e.g., B-mode, harmonic). In some examples, one or more of the various processors shown in FIG. 1 may be implemented by general purpose processors and/or microprocessors configured to perform the specified tasks. In some examples, one or more of the various processors may be implemented as application specific circuits. In some examples, one or more of the various processors (e.g., image processor 136) may be implemented with one or more graphical processing units (GPU).

Figure 2:
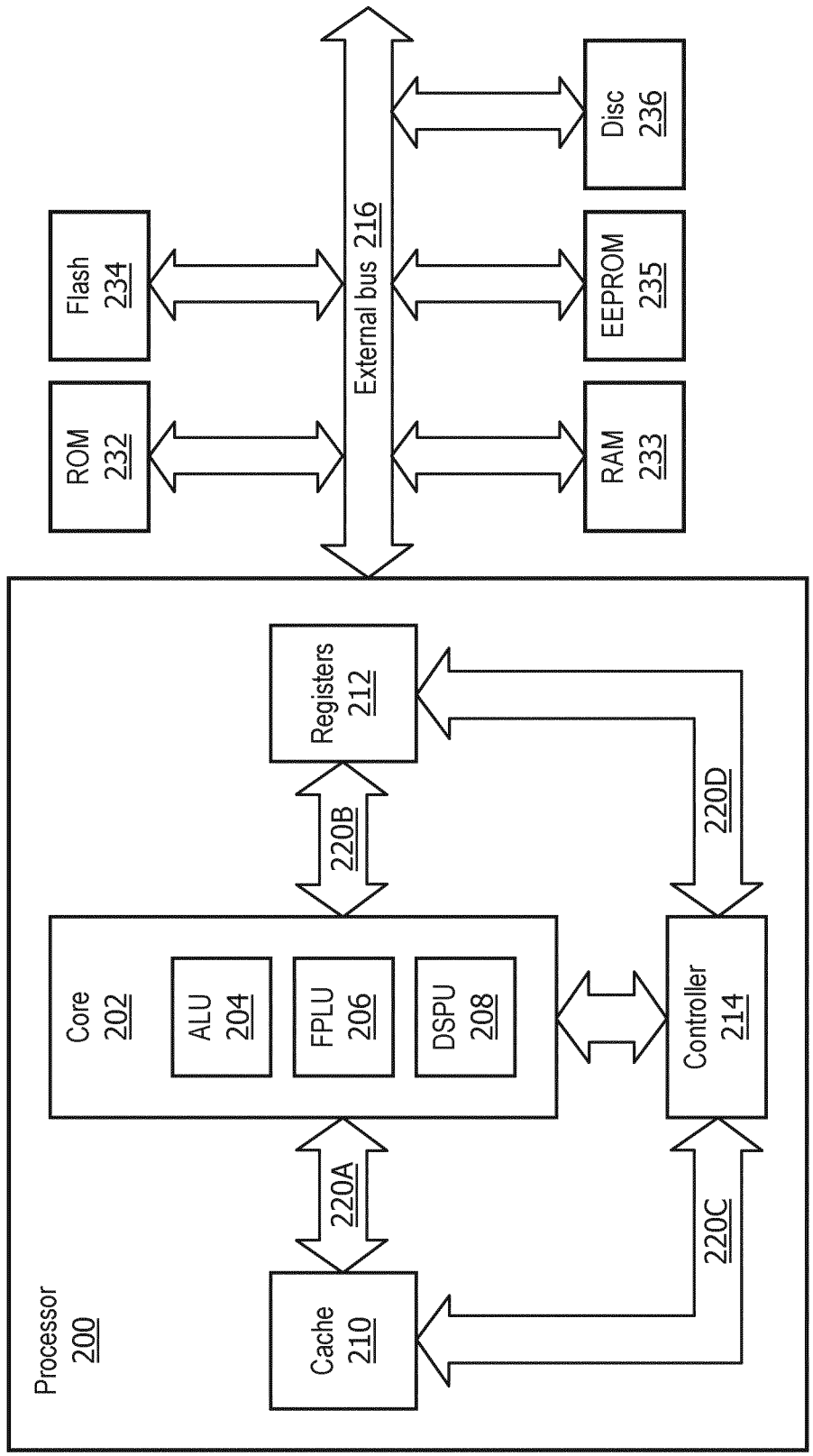
FIG. 2 is a block diagram illustrating an example processor according to principles of the present disclosure.

FIG. 2 is a block diagram illustrating an example processor 200 according to principles of the present disclosure. Processor 200 may be used to implement one or more processors described herein, for example, image processor 136 shown in FIG. 1. Processor 200 may be any suitable processor type including, but not limited to, a microprocessor, a microcontroller, a digital signal processor (DSP), a field programmable array (FPGA) where the FPGA has been programmed to form a processor, a graphical processing unit (GPU), an application specific circuit (ASIC) where the ASIC has been designed to form a processor, or a combination thereof.

The processor 300 may include one or more cores 202. The core 202 may include one or more arithmetic logic units (ALU) 804. In some examples, the core 202 may include a floating point logic unit (FPLU) 206 and/or a digital signal processing unit (DSPU) 208 in addition to or instead of the ALU 204.

The processor 200 may include one or more registers 212 communicatively coupled to the core 202. The registers 212 may be implemented using dedicated logic gate circuits (e.g., flip-flops) and/or any memory technology. In some examples the registers 212 may be implemented using static memory. The register may provide data, instructions and addresses to the core 202.

In some examples, processor 200 may include one or more levels of cache memory 210 communicatively coupled to the core 202. The cache memory 210 may provide computer-readable instructions to the core 202 for execution. The cache memory 210 may provide data for processing by the core 202. In some examples, the computer-readable instructions may have been provided to the cache memory 210 by a local memory, for example, local memory attached to the external bus 3216. The cache memory 210 may be implemented with any suitable cache memory type, for example, metal-oxide semiconductor (MOS) memory such as static random access memory (SRAM), dynamic random access memory (DRAM), and/or any other suitable memory technology.

The processor 200 may include a controller 314, which may control input to the processor 200 from other processors and/or components included in a system (e.g., control panel 152 and scan converter 130 shown in FIG. 1) and/or outputs from the processor 200 to other processors and/or components included in the system (e.g., display 138 and volume renderer 134 shown in FIG. 1). Controller 214 may control the data paths in the ALU 204, FPLU 206 and/or DSPU 208. Controller 214 may be implemented as one or more state machines, data paths and/or dedicated control logic. The gates of controller 214 may be implemented as standalone gates, FPGA, ASIC or any other suitable technology.

The registers 212 and the cache 210 may communicate with controller 214 and core 202 via internal connections 220A, 220B, 220C and 220D. Internal connections may implemented as a bus, multiplexor, crossbar switch, and/or any other suitable connection technology.

Inputs and outputs for the processor 200 may be provided via a bus 216, which may include one or more conductive lines. The bus 216 may be communicatively coupled to one or more components of processor 200, for example the controller 214, cache 210, and/or register 212. The bus 216 may be coupled to one or more components of the system, such as display 138 and control panel 152 mentioned previously.

The bus 216 may be coupled to one or more external memories. The external memories may include Read Only Memory (ROM) 232. ROM 232 may be a masked ROM, Electronically Programmable Read Only Memory (EPROM) or any other suitable technology. The external memory may include Random Access Memory (RAM) 233. RAM 233 may be a static RAM, battery backed up static RAM, Dynamic RAM (DRAM) or any other suitable technology. The external memory may include Electrically Erasable Programmable Read Only Memory (EEPROM) 235. The external memory may include Flash memory 234. The external memory may include a magnetic storage device such as disc 236. In some examples, the external memories may be included in a system, such as ultrasound imaging system 100 shown in FIG. 1, for example local memory 142.

HRI is calculated as the echo-intensity ratio of liver to kidney. According to principles of the present disclosure, echo intensities from the liver and kidney are estimated by selecting ROIs within the liver parenchyma and the kidney cortex at the same depth. For example, a user may view either a B-mode image or an RF image on display 138 and use the control panel 152 to select the two regions of interest. Based on the ROIs selected, the HRI calculator 146 may average the signal values (e.g., echo intensities) at locations corresponding to the ROIs. The signal values may be based on the underlying RF data (e.g., harmonic and fundamental frequency components) regardless of whether the user is viewing the RF image or the B-mode image. Thus, a user may view a B-mode image, which may be easier for the user to interpret than an RF image while the HRI is calculated from the RF data that is independent of instrument settings such as gain, TGC, and dynamic range.

A user will attempt to select homogenous regions of the liver and kidney to avoid "throwing off" the average signal values of the ROIs. However, it may be difficult to find a suitable ROI that does not include in homogeneities. To avoid measurement errors due to small defects (e.g., bright vessel walls and dark vessel lumens of small vessels) within each ROI, in some examples, a small percentage (e.g., 5, %, 10%) of either strongest and/or weakest signals are excluded so that only the medium (e.g., median 80%, 90%) values are averaged as the mean signal value. In some examples, the signals eliminated may correspond to the brightest and/or darkest pixels in the ROIs.

In some examples, echo intensity may be calculated from the envelope of backscattered RF signals. As the echo intensity is dependent on both image modes (e.g., harmonic vs fundamental imaging) and transmit pulse frequency content, the RF signal can be split into the fundamental signal $RF_{fund}$ and the harmonic signal $RF_{harm}$ (e.g., by summer 172 and subtractor 174). Both $RF_{fund}$ and $RF_{harm}$ may be further processed with a number ($n=n_1+n_2$) of bandpass filters BPF (e.g., fundamental BPF 176 and harmonic BPF 178). In some examples, only the fundamental component(s) may be used to calculate the HRI. In other examples, only the harmonic components(s) may be used to calculate the HRI. In still other examples, a combination of the fundamental and harmonic components may be used to calculate the HRI. For example, all the bandpassed components can be linearly summed (referred to as LinSum) as:

$$\Sigma_{i=1}^{n1} C_i \times BPF_i(RF_{fund}) + \Sigma_{i=1}^{n2} C_i \times BPF_i(RF_{harm}) \quad (1)$$

with weighting coefficients $C_i$ satisfying the condition $\Sigma_{i=1}^{n1+n2} C_i = 1$. Equation (1) for the echo intensity may be solved for every location in the ROI of the liver ($LinSum_L$) and the ROI of the kidney ($LinSum_K$). The average of echo intensity values may then be determined for each ROI ($ALinSum_K$ and $ALinSum_L$). In some examples, a percentage of the highest and/or lowest intensity values may be removed prior to averaging, as discussed above. The HRI may then be calculated as $HRI = ALinSum_L/ALinSum_K$. In some applications, the fundamental components may dominate the HRI found by LinSum, although this may be adjusted by the weighting coefficients. LinSum shown in Equation (1) may be desirable when only harmonic or fundamental components are used (e.g., the weighting coefficients for the other components are zero).

Alternatively, in some examples, all the bandpassed components can be summed on a logarithmic scale and then converted back to the linear scale (referred to as LogSum), that is:

$$10 \left( \sum_{i=1}^{n1} C_i \times \log(BPF_i(RF_{fund})) + \sum_{i=1}^{n2} C_i \times \log(BPF_i(RF_{harm})) \right) \quad (2)$$

with weighting coefficients $C_i$ satisfying the condition $\Sigma_{i=1}^{n1+n2} C_i = 1$. Equation (2) may be solved for the ROI of the liver ($LogSum_L$) and the ROI of the kidney ($LogSum_K$). The average of echo intensity values may then be determined for each ROI ($ALogSum_K$ and $ALogSum_L$). In some examples, a percentage of the highest and/or lowest intensity values may be removed prior to averaging, as discussed above. The HRI may then be calculated as $HRI = ALogSum_L/ALogSum_K$. In some applications, the harmonic components may be enhanced in the HRI found by LogSum, although this may be adjusted by the weighting coefficients. LogSum shown in Equation (2) may be desirable when both harmonic and fundamental components are used.

FIGS. 3A-3B and FIGS. 4A-4B are example ultrasound images of liver and kidney from two subjects. The first subject had a PDFF of 0.5 and the second subject had a PDFF of 22 based on MR data. That is, the second subject had a fattier liver than the first subject.

FIG. 3A is an example ultrasound image of a first subject acquired in a first harmonic/fundamental imaging mode according to principles of the present disclosure. The first imaging mode is referred to as HGen (e.g., harmonic general). The image in FIG. 3A is an RF data image that is a blend of harmonic and fundamental frequency components. In HGen, three filters (e.g., BPFs) are used to pass harmonic signal components and a single filter is used to pass the fundamental components. The weighting factors used in FIG. 3A were 0.30, 0.30, 0.32, and 0.08. Thus, the image in FIG. 3A emphasizes the harmonic components, which may provide better details and object boundaries compared to images that emphasize fundamental components.

FIG. 3B an example ultrasound image of the first subject acquired in a second harmonic/fundamental imaging mode according to principles of the present disclosure. The second imaging mode is referred to as HPen (e.g., harmonic penetration). Like the image in FIG. 3A, the image in FIG. 3B is an RF data image that is a blend of harmonic and fundamental frequency components. In HPen, two filters are used to pass harmonic signal components and two filters are used to pass the fundamental components. The weighting factors used in FIG. 3B were 0.35, 0.35, 0.15, and 0.15. Thus, the image in FIG. 3B includes more fundamental frequency components than FIG. 3A, which may provide better depth penetration due to the longer wavelengths of the fundamental frequency components.

In both FIGS. 3A and 3B, selection boxes 302 and 304 are visible. The selection box 302 may be positioned by a user to select a desired ROI in the liver and selection box 304 may be positioned by the user to select a desired ROI in the kidney. The placement of the selection boxes 302 and 304 may be performed via a user interface (e.g., user interface 124), which may include a control panel (e.g., control panel 152).

Figure 4B:
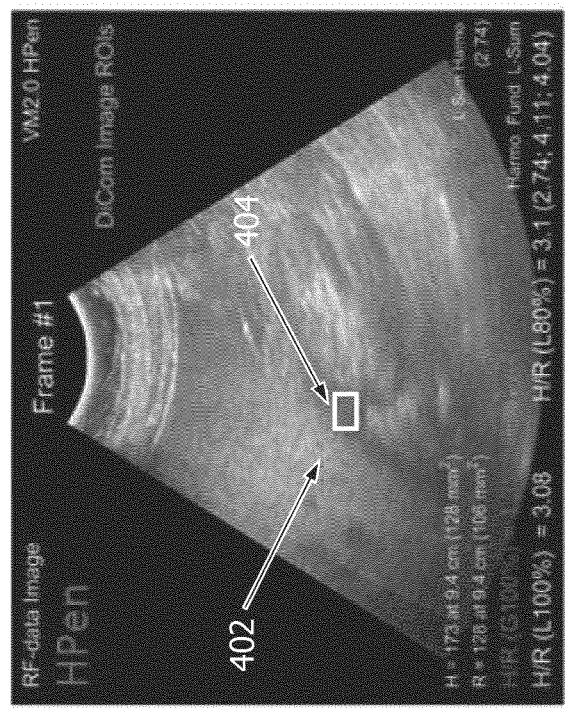
FIG. 4B is an example ultrasound image of the subject acquired in the second harmonic/fundamental imaging mode according to principles of the present disclosure.
Figure 4A:
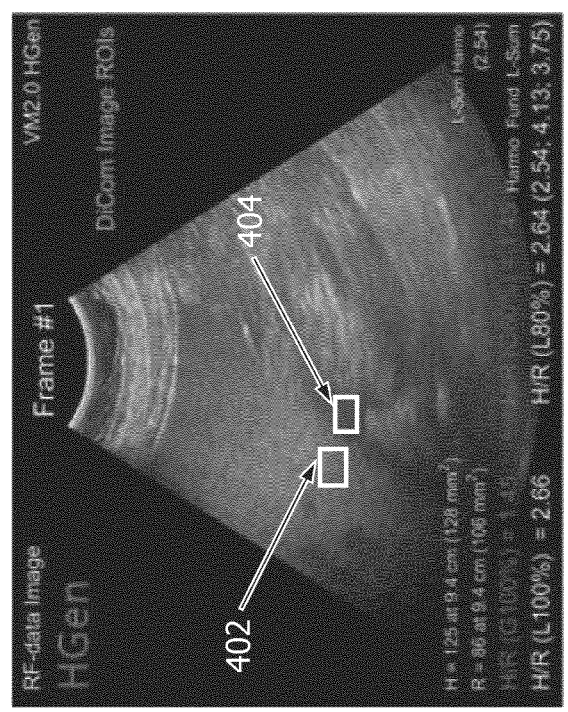
FIG. 4A is an example ultrasound image of a second subject acquired in the first harmonic/fundamental imaging mode according to principles of the present disclosure.

FIG. 4A is an example ultrasound image of a second subject acquired in the first harmonic/fundamental imaging mode according to principles of the present disclosure. The image in FIG. 4A is an RF data image that is a blend of harmonic and fundamental frequency components acquired in HGen mode with the same settings used to acquire the image in FIG. 3A.

FIG. 4B an example ultrasound image of the second subject acquired in the second harmonic/fundamental imaging mode according to principles of the present disclosure. The image in FIG. 4B is an RF data image that is a blend of harmonic and fundamental frequency components acquired in HGen mode with the same settings used to acquire the image in FIG. 3B.

Similar to FIGS. 3A and 3B, in FIGS. 4A and 4B, selection boxes 402 and 404 are visible. The selection box 402 may be positioned by a user to select a desired ROI in the liver and selection box 404 may be positioned by the user to select a desired ROI in the kidney. The placement of the selection boxes 402 and 404 may be performed via a user interface (e.g., user interface 124), which may include a control panel (e.g., control panel 152).

From visual observation of the RF images in FIGS. 3A-3B and 4A-4B, it can be seen that the median signal intensities in ROIs indicated by selection boxes 302 and 304 are similar whereas the median signal intensity in the ROI indicated by selection box 402 is higher than the median signal intensity in the ROI indicated by selection box 404. This qualitative visual observation is confirmed by the quantitative calculations of HRI for the two subjects.

Table 1 shows HRI values calculated according to principles of the present disclosure for the two subjects from both the HGen and HPen mode images. Four different approaches according to the present disclosure were used to calculate the HRI: fundamental component(s) only, harmonic component(s) only, and the linear (LinSum) and log-scaled (LogSum) summations of fundamental and harmonic components. The ratio of the HRI values for the HRI values calculated for fundamental and harmonic components was also calculated.

TABLE 1

| Subject | PDFF | Mode | HRI Fundamental | HRI Harmonic | HRI LinSum | HRI LogSum | Fundamental to harmonic ratio |
|---|---|---|---|---|---|---|---|
| #1 | 0.5 | HGen | 1.01 | 1.09 | 1.06 | 1.09 | 0.93 |
| (lean) |  | HPen | 1.01 | 1.11 | 1.02 | 1.08 | 0.91 |
| #2 | 22 | HGen | 4.13 | 2.54 | 3.75 | 2.54 | 1.63 |
| (fatty liver) |  | HPen | 4.11 | 2.74 | 4.04 | 3.10 | 1.50 |

Overall, low HRI values (close to 1) are seen for the lean liver of the first subject, while much greater HRI values and larger fundamental-to-harmonic HRI ratios are observed for the steatosis liver of the second subject. We note that the harmonic based HRI for HPen is slightly greater than that for HGen. This may be caused by the lower frequency bandpass filters used for HPen compared to HGen. The HRI values from linearly summed (LinSum) fundamental-and-harmonic echo components are weighted towards the fundamental-based HRI values. In contrast, the HRI values from log-summed (LogSum) fundamental-and-harmonic echo components are closer to the harmonic-based HRI values. The values shown in Table 1 indicate that a robust HRI measurement that is insensitive to imaging mode or instrument settings may be achieved with an adequately filtered and/or weighted combination of both fundamental and harmonic echo signals.

In addition, in some examples, the fundamental-to-harmonic HRI ratio (alternatively, the LinSum-to-LogSum HRI ratio) may be used as an extra differentiator for lean and fatty livers. In some examples, a single compounding index may be designed from well-conditioned fundamental and harmonic HRI values as well as various HRI ratios. As an example, such a single compounding index may be calculated as a main factor (e.g., the mean of fundamental and harmonic HRI values) multiplied by the square root of a secondary factor (e.g., the fundamental and harmonic HRI ratio). The square root (½ power) is employed simply for a reduced effect of the secondary factor.

Figure 5:
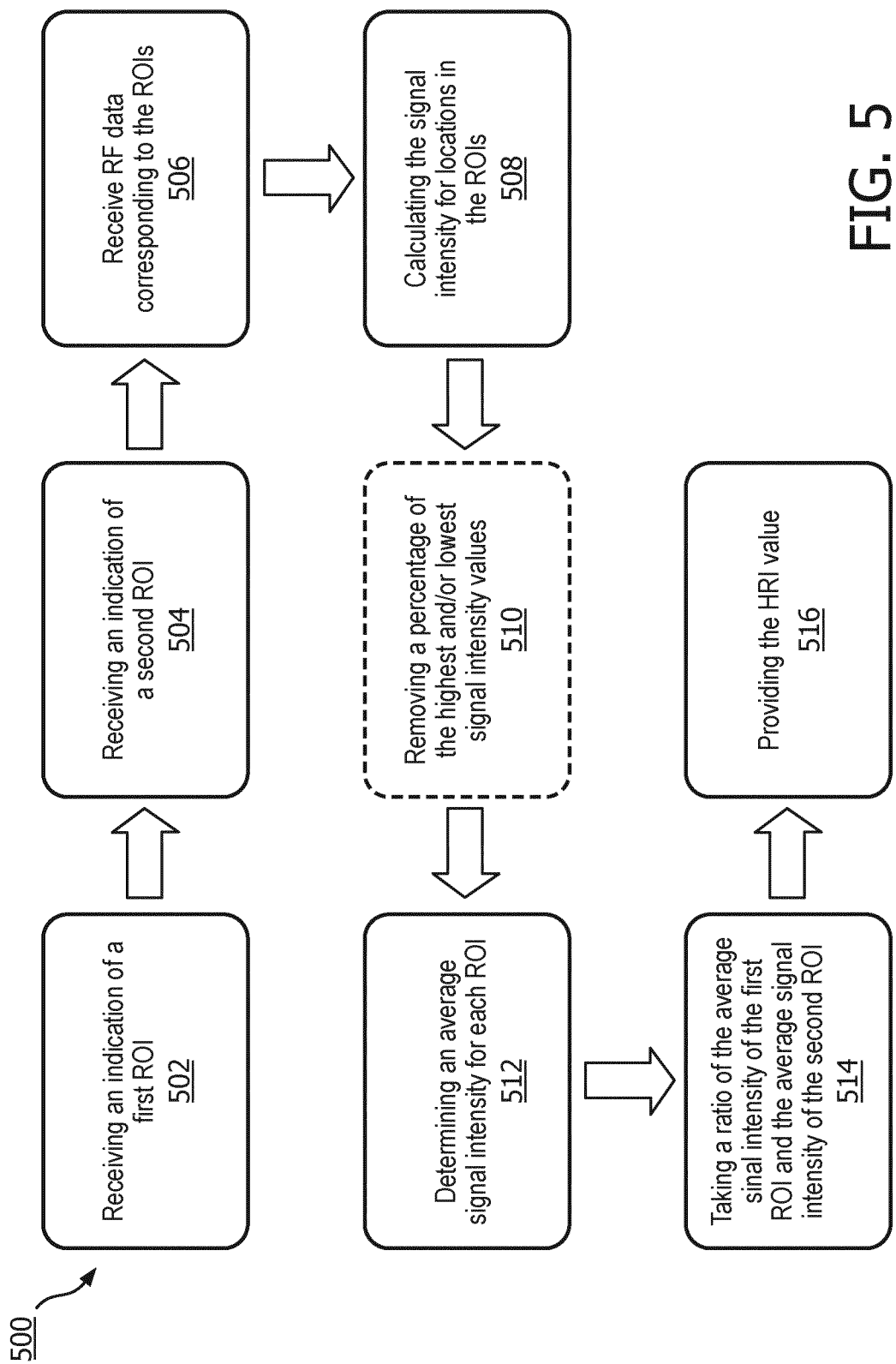
FIG. 5 is a flow chart of a method according to principles of the present disclosure.

FIG. 5 is a flow chart 500 of a method according to principles of the present disclosure. Some or all of the method shown in FIG. 5 may be performed by an HRI calculator, such as HRI calculator 146.

At block 502, "Receiving an indication of a first ROI" may be performed. In some examples, the first ROI may correspond to a location in a hepatic parenchyma. At block 504, "Receiving an indication of a second ROI" may be performed. In some examples, the second ROI may correspond to a location in a renal cortex. Both the indications of the first and second ROI may be received from a user interface that receives a user input (e.g., user interface 124). In some examples, block 502 and 504 may be performed simultaneously. In some examples, block 504 may be performed before block 502.

At block 506, "Receiving RF data corresponding to the ROIs" may be performed. The RF data for the first and second ROIs may be received from a signal processor (e.g., signal processor 126) in some examples. The RF data may include fundamental and/or harmonic frequency component(s). At block 508, "Calculating the signal intensity for all locations in the ROIs" may be performed. The locations in the first and second ROIs may correspond to pixels or voxels in some examples. The calculations may be based on the received RF data. In some examples, the signal intensity may be based only on the fundamental frequency components. In other examples, the signal intensity may be based only on the harmonic frequency components. In further examples, the signal intensity may be based on a combination of the fundamental and harmonic frequency components. For example, the linear summation of LinSum and/or the logarithmic summation LogSum techniques may be used. In some examples, the signal intensity may correspond to the echo intensity.

Optionally, "Removing a percentage of the highest and/or lowest signal intensity values" may be performed at block 510. Once the signal intensities are calculated for all of the locations in the first and second ROIs, a percentage of the highest signal intensity values and/or the lowest signal intensity values may be removed from the first and second ROIs. This may remove outliers due to inhomogeneities in the ROIs (e.g., blood vessels).

At block 512, "Determining an average signal intensity for each ROI" may be performed. That is, all of the signal intensity values (or remaining signal intensity values if block 510 is performed) calculated for the first ROI may be averaged to generate an average signal intensity value for the first ROI. Similarly, all of the signal intensity values (or remaining signal intensity values if block 510 is performed) calculated for the second ROI may be averaged to generate an average signal intensity value for the second ROI. At block 514, "Taking a ratio of the average signal intensity of the first ROI and the average signal intensity of the second ROI" may be performed. This ratio may generate an HRI value.

At block 516, "Providing the HRI value," may be performed. The HRI value may be provided to a local memory in some examples, such as local memory 142. The HRI value may be provided on a display, such as display 138, in some examples, instead of or in addition to being provided to the local memory.

In some examples, the signal intensities may be calculated in multiple ways and multiple HRI values may be generated and provided, for example, as shown in Table 1.

Systems and methods for calculating Hills (e.g., HRI values) based on RF data are disclosed herein. Calculating the HRI from RF data according to principles of the present disclosure may provide values that are less sensitive to imaging modes and/or instrument settings compared to HRI values based on image intensity values measured from B-mode images.

In various examples where components, systems and/or methods are implemented using a programmable device, such as a computer-based system or programmable logic, it should be appreciated that the above-described systems and methods can be implemented using any of various known or later developed programming languages, such as "C", "C++", "FORTRAN", "Pascal", "VHDL" and the like. Accordingly, various storage media, such as magnetic computer disks, optical disks, electronic memories and the like, can be prepared that can contain information that can direct a device, such as a computer, to implement the above-described systems and/or methods. Once an appropriate device has access to the information and programs contained on the storage media, the storage media can provide the information and programs to the device, thus enabling the device to perform functions of the systems and/or methods described herein. For example, if a computer disk containing appropriate materials, such as a source file, an object file, an executable file or the like, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods and coordinate the functions of the individual systems and/or methods described above.

In view of this disclosure it is noted that the various methods and devices described herein can be implemented in hardware, software, and/or firmware. Further, the various methods and parameters are included by way of example only and not in any limiting sense. In view of this disclosure, those of ordinary skill in the art can implement the present teachings in determining their own techniques and needed equipment to affect these techniques, while remaining within the scope of the invention. The functionality of one or more of the processors described herein may be incorporated into a fewer number or a single processing unit (e.g., a CPU) and may be implemented using application specific integrated circuits (ASICs) or general purpose processing circuits which are programmed responsive to executable instructions to perform the functions described herein.

Although the present system may have been described with particular reference to an ultrasound imaging system, it is also envisioned that the present system can be extended to other medical imaging systems where one or more images are obtained in a systematic manner. Accordingly, the present system may be used to obtain and/or record image information related to, but not limited to renal, testicular, breast, ovarian, uterine, thyroid, hepatic, lung, musculoskeletal, splenic, cardiac, arterial and vascular systems, as well as other imaging applications related to ultrasound-guided interventions. Further, the present system may also include one or more programs which may be used with conventional imaging systems so that they may provide features and advantages of the present system. Certain additional advantages and features of this disclosure may be apparent to those skilled in the art upon studying the disclosure, or may be experienced by persons employing the novel system and method of the present disclosure. Another advantage of the present systems and method may be that conventional medical image systems can be easily upgraded to incorporate the features and advantages of the present systems, devices, and methods.

Of course, it is to be appreciated that any one of the examples, examples or processes described herein may be combined with one or more other examples, examples and/or processes or be separated and/or performed amongst separate devices or device portions in accordance with the present systems, devices and methods.

Finally, the above-discussion is intended to be merely illustrative of the present systems and methods and should not be construed as limiting the appended claims to any particular example or group of examples. Thus, while the present system has been described in particular detail with reference to exemplary examples, it should also be appreciated that numerous modifications and alternative examples may be devised by those having ordinary skill in the art without departing from the broader and intended spirit and scope of the present systems and methods as set forth in the claims that follow. Accordingly, the specification and drawings are to be regarded in an illustrative manner and are not intended to limit the scope of the appended claims.

What is claimed is:

1. An ultrasound imaging system comprising:
   an ultrasound probe configured to transmit ultrasound signals and receive echoes responsive to the ultrasound signals and provide radio frequency (RF) data corresponding to the echoes;
   a user interface configured to receive indications of a first region of interest (ROI) and a second ROI from a user;
   a signal processor configured to receive the RF data and separate the RF data into harmonic frequency components and fundamental frequency components; and
   a processor configured to:
      receive the indications of the first ROI and the second ROI;
      receive the harmonic frequency components and the fundamental frequency components for the first ROI and the second ROI;
      calculate a first average signal intensity value for the first ROI and calculate a second average signal intensity value for the second ROI based on the harmonic frequency components without being based on the fundamental frequency components;
      calculate a first ratio of the first average signal intensity value and the second average signal intensity value, wherein the first ratio is a first Hepato-renal index (HRI) value;
      calculate a third average signal intensity value for the first ROI and calculate a fourth average signal intensity value for the second ROI based on the fundamental frequency components without being based on the harmonic frequency components;
      calculate a second ratio of the third average signal intensity value and the fourth average signal intensity value, wherein the second ratio is a second, different HRI value; and
      calculate a compounding index based on a weighted combination of the first HRI value and the second HRI value.

2. The ultrasound imaging system of claim 1, wherein the user interface includes a display and the processor is further configured to provide at least one of the first ratio, the second ratio, and the compounding index for viewing on the display.

3. The ultrasound imaging system of claim 1, wherein the processor is further configured to:
   calculate a first plurality of signal intensity values for the first ROI and a second plurality of signal intensity values for the second ROI; and
   remove a percentage of highest values of the first plurality of signal intensity values and the second plurality of signal intensity values prior to calculating the first average signal intensity, and the second average signal intensity, the third average signal intensity and the fourth average signal intensity.

4. The ultrasound imaging system of claim 1, wherein the processor is further configured to:
   calculate a first plurality of signal intensity values for the first ROI and a second plurality of signal intensity values for the second ROI; and
   remove a percentage of lowest values of the first plurality of signal intensity values and the second plurality of signal intensity values prior to calculating the first average signal intensity, and the second average signal intensity, the third average signal intensity and the fourth average signal intensity.

5. The ultrasound imaging system of claim 1, further comprising a memory, wherein at least one of the first ratio, the second ratio, and the compounding index are provided to the memory for storage.

6. The ultrasound imaging system of claim 1, further comprising a transmit controller configured to control transmission of the ultrasound signals by the ultrasound probe, wherein the transmit controller is configured to cause the ultrasound probe to transmit the ultrasound signals as two-pulse transmissions.

7. The ultrasound imaging system of claim 6, wherein a first pulse of the two-pulse transmission is an inverse of a second pulse of the two-pulse transmission.

8. The ultrasound imaging system of claim 1, wherein the signal processor includes a fundamental bandpass filter configured to pass the fundamental frequency components and a harmonic bandpass filter configured to pass the harmonic frequency components.

9. The ultrasound imaging system of claim 1, wherein the signal processor includes:
   a summer configured to cancel the fundamental frequency components and produce the harmonic frequency components; and
   a subtractor configured to cancel the harmonic frequency components and produce the fundamental frequency components.

10. The ultrasound imaging system of claim 1, wherein the first average signal intensity value for the first ROI and the second average signal intensity value for the second ROI are calculated based only on the harmonic frequency components.

11. The ultrasound imaging system of claim 1, wherein the third average signal intensity value for the first ROI and the fourth average signal intensity value for the second ROI are calculated based only on the fundamental frequency components.

* * * * *